(12) United States Patent
Tajima et al.

(10) Patent No.: US 12,237,497 B2
(45) Date of Patent: Feb. 25, 2025

(54) ELECTRODE PLATE FOR SECONDARY BATTERIES, AND SECONDARY BATTERY USING SAME

(71) Applicant: SANYO Electric Co., Ltd., Daito (JP)

(72) Inventors: Hiroyuki Tajima, Hyogo (JP); Tetsuya Sato, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 554 days.

(21) Appl. No.: 17/311,961

(22) PCT Filed: Dec. 17, 2019

(86) PCT No.: PCT/JP2019/049492
§ 371 (c)(1),
(2) Date: Jun. 8, 2021

(87) PCT Pub. No.: WO2020/130001
PCT Pub. Date: Jun. 25, 2020

(65) Prior Publication Data
US 2022/0069283 A1    Mar. 3, 2022

(30) Foreign Application Priority Data

Dec. 19, 2018    (JP) .................. 2018-236844

(51) Int. Cl.
*H01M 4/134*    (2010.01)
*H01M 4/38*    (2006.01)
(Continued)

(52) U.S. Cl.
CPC ........... *H01M 4/134* (2013.01); *H01M 4/386* (2013.01); *H01M 4/661* (2013.01);
(Continued)

(58) Field of Classification Search
None
See application file for complete search history.

(56) References Cited

U.S. PATENT DOCUMENTS

2003/0148174 A1    8/2003 Gu
2016/0036009 A1    2/2016 Cho et al.
(Continued)

FOREIGN PATENT DOCUMENTS

CN    1728422 A    *    2/2006    ............. B26D 1/385
CN    206250284 U    6/2017
(Continued)

OTHER PUBLICATIONS

Machine translation of CN1728422A (Year: 2024).*
(Continued)

*Primary Examiner* — Brian R Ohara
*Assistant Examiner* — M. T. Leonard
(74) *Attorney, Agent, or Firm* — WHDA, LLP (57) ABSTRACT

The present invention provides: an electrode plate for secondary batteries, which has high reliability; and a secondary battery which uses this electrode plate. A negative electrode plate for secondary batteries, which comprises: a negative electrode core body that is formed of a metal; and negative electrode active material layers that are formed on both surfaces of the negative electrode core body. This negative electrode plate has a first edge and a negative electrode tab which protrudes from the first edge; and a coating film containing silicon is formed on the end face of the negative electrode core body at the first edge. A secondary battery according to the present invention is provided with a positive electrode plate and the negative electrode plate.

6 Claims, 5 Drawing Sheets

(51) Int. Cl.
  *H01M 4/66* (2006.01)
  *H01M 50/534* (2021.01)
  *H01M 50/588* (2021.01)
  *H01M 50/593* (2021.01)

(52) U.S. Cl.
  CPC ........ *H01M 50/534* (2021.01); *H01M 50/588* (2021.01); *H01M 50/593* (2021.01)

(56) References Cited

U.S. PATENT DOCUMENTS

| | | |
|---|---|---|
| 2017/0047575 A1 | 2/2017 | Tsuji et al. |
| 2019/0280287 A1 | 9/2019 | Fukunaga et al. |

FOREIGN PATENT DOCUMENTS

| | | | |
|---|---|---|---|
| JP | 11-26021 A | 1/1999 | |
| JP | 2003-249209 A | 9/2003 | |
| JP | 2016-33912 A | 3/2016 | |
| JP | 2016-115409 A | 6/2016 | |
| WO | 2017/057762 A1 | 4/2017 | |
| WO | 2018/021214 A1 | 2/2018 | |
| WO | WO-2018099168 A1 * | 6/2018 | .............. H01M 4/13 |

OTHER PUBLICATIONS

Machine translation of WO2017057762A1 (Year: 2024).*
Machine translation WO2018099168A1 (Year: 2024).*
The Extended European Search Report dated Jan. 4, 2022, issued in counterpart to Application No. 19899768.6. (6 pages).
International Search Report dated Mar. 24, 2020, issued in counterpart International Application No. PCT/JP2019/049492. (2 pages).
English translation of Search Report dated Jul. 20, 2024, issued in counterpart to CN Application No. 201980071830.4. (3 pages).
Office Action dated Nov. 29, 2024, issued in counterpart EP application No. 19899768.6, with English translation. (5 pages).

* cited by examiner

ELECTRODE PLATE FOR SECONDARY BATTERIES, AND SECONDARY BATTERY USING SAME

TECHNICAL FIELD

The present invention relates to an electrode plate for a secondary battery and a secondary battery using the same.

BACKGROUND ART

Secondary batteries, such as alkaline secondary batteries and non-aqueous electrolyte secondary batteries, are used in the driving power sources of electric vehicles (EV) and hybrid electric vehicles (HEV or PHEV).

These secondary batteries contain an electrode assembly consisting of a positive electrode plate, a negative electrode plate, and a separator together with an electrolyte in a battery case. The battery case is composed of an exterior body having an opening and a sealing plate that seals the opening of the exterior body. A positive electrode terminal and a negative electrode terminal are attached to the sealing plate. The positive electrode terminal is electrically connected to the positive electrode plate with a positive electrode current collector therebetween, and the negative electrode terminal is electrically connected to the negative electrode plate with a negative electrode current collector therebetween.

As such a secondary battery, a secondary battery has been proposed in which a positive electrode tab group consisting of a plurality of positive electrode tabs and a negative electrode tab group consisting of a plurality of negative electrode tabs are provided at the end of the electrode assembly adjacent to the sealing plate (see Patent Literature 1).

CITATION LIST

Patent Literature

PATENT LITERATURE 1: Japanese Unexamined Patent Application Publication No. 2016-115409

SUMMARY

It is an advantage of the present invention to provide a highly reliable secondary battery.

A secondary battery electrode plate according to one aspect of the present invention has a metal core body and an active material layer on both sides of the core body, wherein the electrode plate has a first side and a tab protruding from the first side, and a coating containing silicon is formed on an end surface of the core body on the first side.

A secondary battery according to one aspect of the present invention includes the electrode plate and another electrode plate having a polarity different from that of the electrode plate.

According to the present invention, a highly reliable secondary battery can be provided.

DESCRIPTION OF EMBODIMENTS

The configuration of a square secondary battery 20 as a secondary battery according to the embodiment will be described below. Note that the present invention is not limited to the following embodiments.

Figure 1:
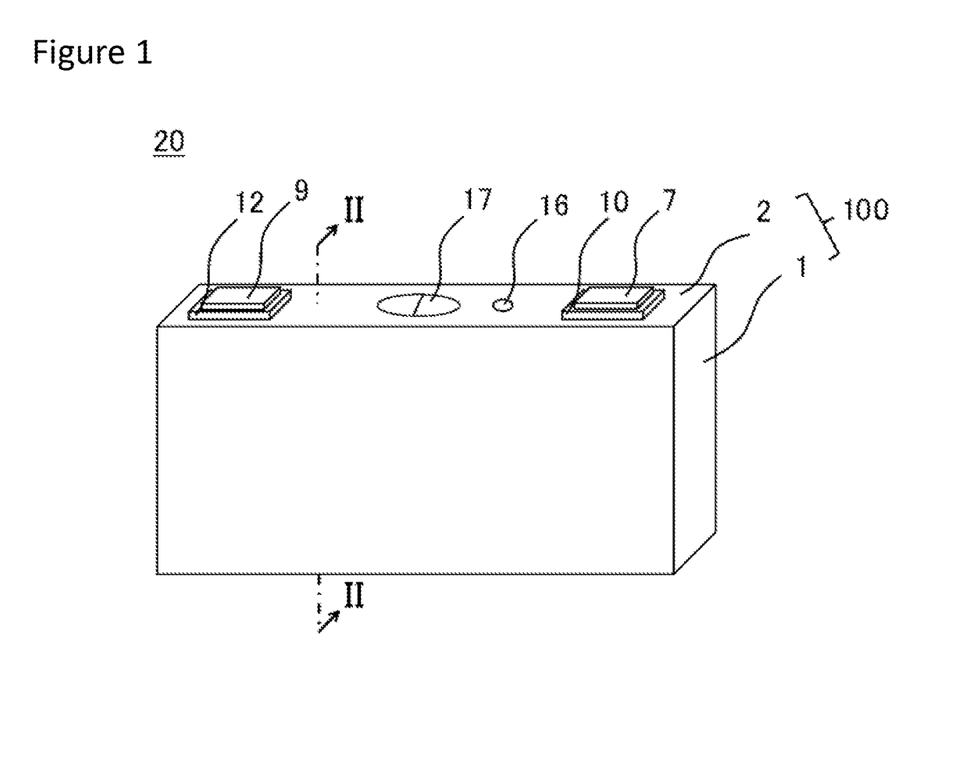
FIG. 1 is a perspective view of a secondary battery according to an embodiment.
Figure 2:
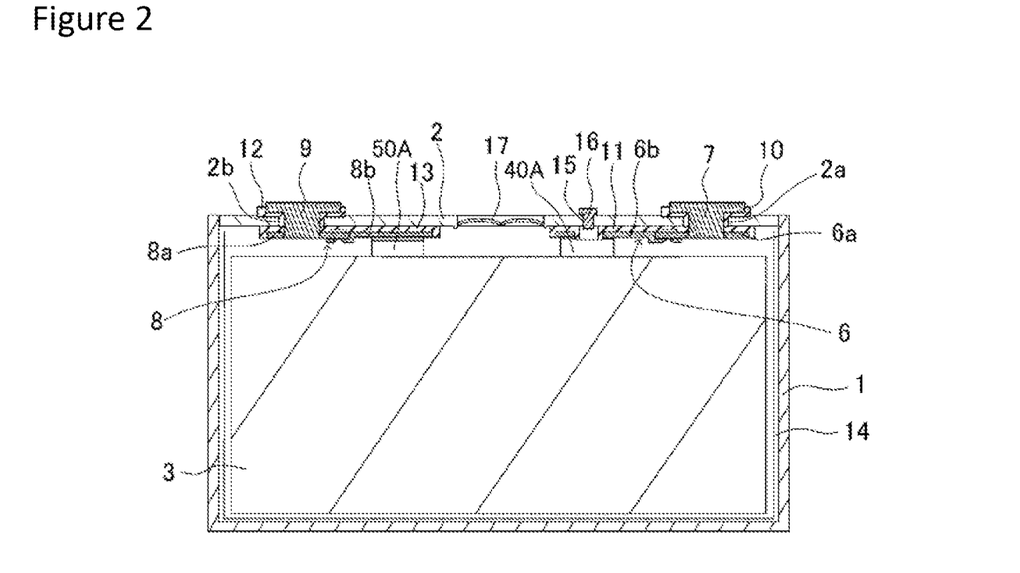
FIG. 2 is a cross-sectional view taken along line II-II in FIG. 1.

As shown in FIGS. 1 and 2, the square secondary battery 20 comprises a battery case 100 consisting of a bottomed hollow rectangular cylindrical exterior body 1 having an opening and a sealing plate 2 for sealing the opening of the square exterior body 1. The square exterior body 1 and the sealing plate 2 are preferably made of metal. An electrode assembly 3 including a positive electrode plate and a negative electrode plate is accommodated in the square exterior body 1 together with an electrolyte.

At the end of the electrode assembly 3 adjacent to the sealing plate 2, a positive electrode tab group 40A composed of a plurality of positive electrode tabs 40 and a negative electrode tab group 50A composed of a plurality of negative electrode tabs 50 are provided. The positive electrode tab group 40A is electrically connected to a positive electrode terminal 7 via a second positive electrode current collector 6b and a first positive electrode current collector 6a. The negative electrode tab group 50A is electrically connected to a negative electrode terminal 9 via a second negative electrode current collector 8b and a first negative electrode current collector 8a. The first positive electrode current collector 6a and the second positive electrode current collector 6b constitute a positive electrode current collector 6. Note that the positive electrode current collector 6 may be used as one component. The first negative electrode current collector 8a and the second negative electrode current collector 8b constitute a negative electrode current collector 8. Note that the negative electrode current collector 8 may be used as one component.

The first positive electrode current collector 6a, the second positive electrode current collector 6b, and the positive electrode terminal 7 are preferably made of metal, and more preferably made of aluminum or an aluminum alloy. A resin external insulating member 10 is disposed between the positive electrode terminal 7 and the sealing plate 2. A resin internal insulating member 11 is disposed between the first positive electrode current collector 6a and the second positive electrode current collector 6b, and the sealing plate 2.

The first negative electrode current collector 8a, the second negative electrode current collector 8b, and the negative electrode terminal 9 are preferably made of metal, more preferably copper or a copper alloy. The negative electrode terminal 9 preferably has a portion of aluminum or an aluminum alloy and a portion of copper or a copper alloy. In this case, the portion of copper or a copper alloy is preferably connected to the first negative electrode current collector 8a so that the portion of aluminum or an aluminum alloy protrudes to the outside of the sealing plate 2. A resin external insulating member 12 is disposed between the negative electrode terminal 9 and the sealing plate 2. A resin internal insulating member 13 is disposed between the first negative electrode current collector 8a and the second negative electrode current collector 8b, and the sealing plate 2.

An electrode assembly holder 14 composed of a resin sheet, which is made of resin, is disposed between the electrode assembly 3 and the square exterior body 1. The electrode assembly holder 14 is preferably formed by curving a resin insulating sheet into a bag shape or a box shape. The sealing plate 2 has an electrolytic solution injection hole 15, and the electrolytic solution injection hole 15 is sealed by a sealing member 16. The sealing plate 2 has a gas discharge valve 17 that breaks when the pressure inside the battery case 100 exceeds a predetermined value to discharge the gas inside the battery case 100 to the outside of the battery case 100.

A method of manufacturing the square secondary battery 20 and the details of each component will now be explained.

[Positive Electrode Plate]

The method of manufacturing the positive electrode plate will be first explained.

[Preparation of Positive Electrode Active Material Layer Slurry]

Lithium nickel manganese cobalt oxide as a positive electrode active material, polyvinylidene fluoride (PVdF) as a binder, a carbon material as a conductive agent, and N-methyl-2-pynolidone (NMP) as a dispersion medium are mixed so that the lithium nickel manganese cobalt oxide: PVdF:carbon material mass ratio becomes 97.5:1:1.5, thereby preparing a positive electrode active material layer slurry.

[Preparation of Positive Electrode Protective Layer Slurry]

Alumina powder, a carbon material as a conductive material, polyvinylidene fluoride (PVdF) as a binder, and N-methyl-2-pyrrolidone (NMP) as a dispersion medium are mixed so that the alumina powder:carbon material:PVdF mass ratio becomes 83:3:14, thereby preparing a protective layer slurry.

[Formation of Positive Electrode Active Material Layer and Positive Electrode Protective Layer]

The positive electrode active material layer slurry and the positive electrode protective layer slurry prepared by the aforementioned method are applied to both sides of an aluminum foil as a positive electrode core body having a thickness of 15 μm with a die coater. At this time, the positive electrode active material layer slurry is applied to the center of the positive electrode core body with respect to the width direction. Further, the positive electrode protective layer slurry is applied to both ends with respect to the width direction of the region coated with the positive electrode active material layer slurry.

The positive electrode core body coated with the positive electrode active material layer slurry and the positive electrode protective layer slurry is dried to remove NMP contained in the positive electrode active material layer slurry and the positive electrode protective layer slurry. Thus, a positive electrode active material layer and a protective layer are formed. After that, the positive electrode active material layer is compressed into a positive electrode original plate 400 by passing it between a pair of press rollers.

Figure 3:
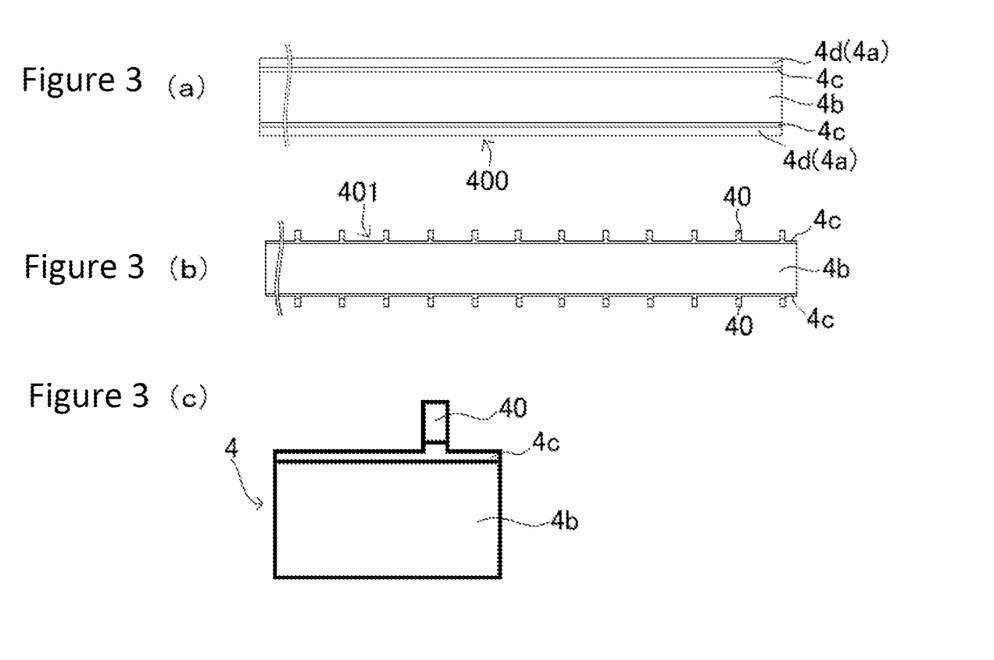
FIG. 3A is a plan view of a positive electrode original plate.
FIG. 3B is a plan view of the positive electrode original plate with tabs already formed.
FIG. 3C is a plan view of the positive electrode plate.

FIG. 3A is a plan view of the positive electrode original plate 400 fabricated by the aforementioned method. A positive electrode active material layer 4b is formed on both sides of a strip-shaped positive electrode core body 4a along the longitudinal direction of the positive electrode core body 4a. In the positive electrode core body 4a, a positive electrode protective layer 4c is formed at both ends with respect to the width direction of the region where the positive electrode active material layer 4b is formed. A positive electrode core body exposed portion 4d is formed at both ends of the positive electrode original plate 400 with respect to the width direction of the positive electrode original plate 400 along the longitudinal direction. Note that the thickness of the positive electrode active material layer 4b is preferably larger than the thickness of the positive electrode protective layer 4c. The thickness of the positive electrode protective layer 4c formed on one side of the positive electrode core body is preferably 10 to 100 μm, more preferably 15 to 50 μM.

[Forming Tabs]

FIG. 3B is a plan view of the positive electrode original plate 401 with tabs already formed. Cutting the positive electrode core body exposed portion 4d of the positive electrode original plate 400 into a predetermined shape leaves the positive electrode original plate 401 with tabs already formed. When the positive electrode original plate 400 is cut to form tabs, the positive electrode original plate 400 is preferably cut by irradiating energy such as laser beams.

It is preferable to use a continuous oscillation (CW) laser for laser cutting. The output of the laser is preferably 500 W to 1200 W, more preferably 550 W to 1000 W, and even more preferably 600 W to 1000 W. The scanning speed of the laser is preferably 100 mm/s to 5000 mm/s. However, this is not necessarily the case. Note that a pulsed laser may be used instead.

In the positive electrode original plate 401 with tabs already formed, there are a plurality of positive electrode tabs 40 at both ends of the positive electrode original plate 401 with respect to the width direction with tabs already formed. Each positive electrode tab 40 is composed of a positive electrode core body exposed portion 4d. As shown in FIG. 3B, the positive electrode original plate 400 can be cut so that the positive electrode protective layer 4c remains at the base of each positive electrode tab 40 and at sides of the positive electrode original plate 401 obtained between the adjacent positive electrode tabs 40 with tabs already formed.

FIG. 3C is a plan view of the positive electrode plate 4. First, the positive electrode original plate 401 with tabs already formed is cut at the central portion with respect to the width direction along the longitudinal direction of the positive electrode original plate 401 with tabs already formed. After that, the positive electrode original plate 401 with tabs already formed is cut at predetermined intervals in the longitudinal direction of the positive electrode original plate 401 with tabs already formed, thereby fabricating the positive electrode plate 4. The positive electrode original plate 401 with tabs already formed can be cut by laser cutting, cutting using a mold or a cutter, or the like. The positive electrode original plate 401 with tabs already formed is preferably cut by a mold or a cutter.

[Negative Electrode Plate]

A method of manufacturing a negative electrode plate will now be explained.

[Preparation of Negative Electrode Active Material Layer Slurry]

Graphite as a negative electrode active material, styrene-butadiene rubber (SBR) and carboxymethyl cellulose (CMC) as a binder, and water as a dispersion medium are mixed so that the graphite:SBR:CMC mass ratio becomes 98:1:1, thereby preparing a negative electrode active material layer slurry.

[Formation of Negative Electrode Active Material Layer]

The negative electrode active material layer slurry prepared by the aforementioned method is applied to both sides of a 8-μm-thick copper foil as the negative electrode core body with a die coater.

The negative electrode core body coated with the negative electrode active material layer slurry is dried to remove the water contained in the negative electrode active material layer slurry. Thus, the negative electrode active material layer is formed. After that, the negative electrode active material layer is compressed into the negative electrode original plate 500 by passing it between the pair of press rollers.

Figure 4:
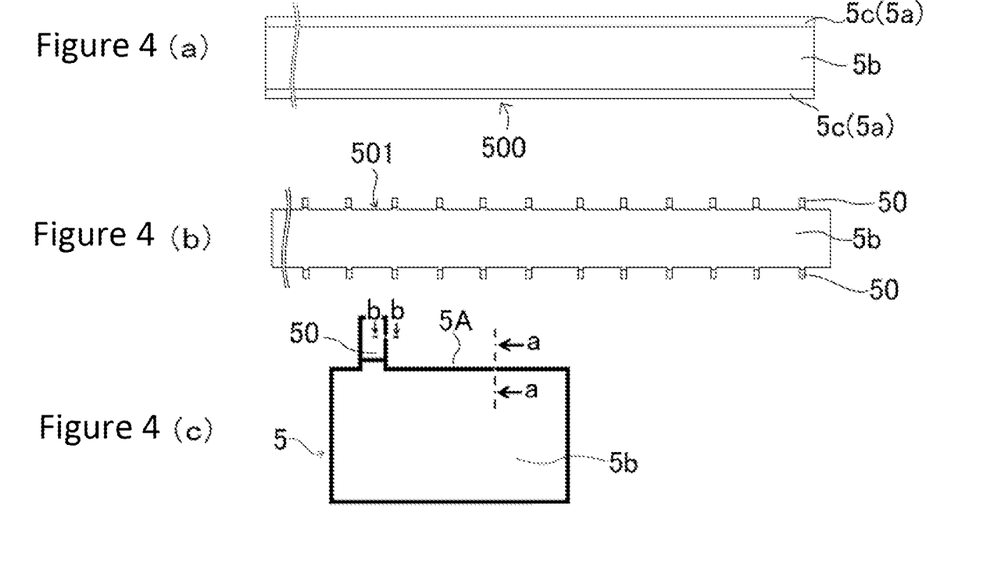
FIG. 4A is a plan view of a negative electrode original plate.
FIG. 4B is a plan view of the negative electrode original plate with tabs already formed.
FIG. 4C is a plan view of the negative electrode plate.

FIG. 4A is a plan view of the negative electrode original plate 500 fabricated by the aforementioned method. Negative electrode active material layers 5b are formed on both sides of a strip-shaped negative electrode core body 5a along the longitudinal direction of the negative electrode core body 5a. Negative electrode core body exposed portions 5c are formed at both ends of the negative electrode original plate 500 with respect to the width direction along the longitudinal direction of the negative electrode original plate 500.

FIG. 4B is a plan view of a negative electrode original plate 501 with tabs already formed. The negative electrode original plate 501 with tabs already formed is fabricated by cutting the negative electrode core body exposed portion 5c of the negative electrode original plate 501 with tabs already formed, into a predetermined shape. In cutting the negative electrode original plate 500 for forming tabs, the negative electrode original plate 500 is preferably cut by laser irradiation or other energy irradiation.

The laser cutting preferably uses a continuous oscillation (CW) laser. The laser output is preferably in the range of 500 to 1500 W, more preferably 600 to 1400 W, and even more preferably 650 to 1400 W. The laser scanning speed is preferably in the range of 100 to 5000 mm/s. However, this is not necessarily the case. Note that a pulsed laser beam may be used.

FIG. 4C is a plan view of the negative electrode plate 5. First, the negative electrode original plate 501 with tabs already formed is cut at the central portion with respect to the width direction along the longitudinal direction of the negative electrode original plate 501 with tabs already formed. After that, the negative electrode original plate 501 with tabs already formed is cut at predetermined intervals in the longitudinal direction of the negative electrode original plate 501 with tabs already formed, thereby fabricating the negative electrode plate 5. The negative electrode original plate 501 with tabs already formed can be cut by laser cutting, cutting using a mold or a cutter, or the like. The positive electrode original plate 401 with tabs already formed is preferably cut by a mold or a cutter.

Figure 5:
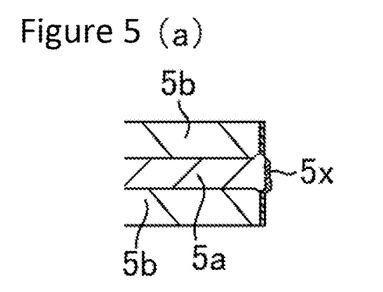
FIG. 5A is a cross-sectional view along line a-a in FIG. 4C.
FIG. 5B is a cross-sectional view along line b-b in FIG. 4C.

FIG. 5A is a cross-sectional view taken along line a-a in FIG. 4C, and is a cross-sectional view of the first side 5A from which the negative electrode tab 50 protrudes, in the negative electrode plate 5. FIG. 5B is a cross-sectional view taken along line b-b in FIG. 4C, and is a cross-sectional view of the end of the negative electrode tab 50.

As shown in FIG. 5A, a silicon-containing coating 5x is formed on the end surface of the negative electrode core body 5a on the first side 5A. A protrusion that protrudes from the upper or lower side of the negative electrode core body 5a in the thickness direction of the negative electrode core body 5a is formed at the end of the negative electrode core body 5a on the first side 5A. Hence, the thickness of the end of the negative electrode core body 5a on the first side 5A is larger than the thickness of the portion of the negative electrode core body 5a where the negative electrode active material layer 5b is formed.

A silicon-containing coating 5x is formed on the end surface of the negative electrode core body 5a on the first side 5A. This makes it possible to suppress the phenomenon that the portion of the negative electrode core body 5a where the end surface is exposed comes into contact with the separator and damages the separator. For instance, the end surface of the negative electrode core body 5a of copper or a copper alloy may have a pointed portion. Covering this pointed portion with a coating 5x can suppress the phenomenon that the pointed portion damages the separator.

When the end surface of the negative electrode core body 5a of copper or a copper alloy has a pointed portion, the pointed portion may separate from the negative electrode core body 5a and cause a short circuit. Covering this pointed portion with a coating 5x can suppress the phenomenon that the pointed portion separates from the negative electrode core body 5a.

When the electrode assembly 3 is viewed in a plan view in the state of the electrode assembly 3, the regions of the positive electrode plate 4 in which the positive electrode active material layer 4b is formed are preferably located in the regions of the negative electrode plate 5 where the negative electrode active material layer 5b is formed. Such a structure includes a region where the first side 5A of the negative electrode plate 5 and the positive electrode tab 40 face each other through the separator. Here, a coating 5x formed on the end surface of the negative electrode core body 5a on the first side 5A can reliably prevent a direct contact between a copper or a copper alloy portion constituting the negative electrode core body 5a and the positive electrode plate 4. Hence, compared to the case where the end surface of the negative electrode core body 5 of copper or a copper alloy comes into direct contact with the positive electrode plate 4, the flow of large current can be suppressed.

As shown in FIG. 5A, a silicon-containing coating 5x may also be formed on the end surface of the negative electrode active material layer 5b on the first side 5A. This effectively suppresses separation of the negative electrode active material layer 5b. Thus, the secondary battery has higher reliability.

As shown in FIG. 5B, a silicon-containing coating 5x may also be formed on the end surface of the negative electrode tab 50. Even if a pointed portion of copper or a copper alloy resides on the end surface of the negative electrode tab 50, the phenomenon that this pointed portion separates from the end surface of the negative electrode tab 50 and cause a short circuit can be effectively suppressed.

The coating 5x can be formed by applying on the end surface of the negative electrode core body 5a on the first side 5A. Alternatively, the coating 5x can be formed by laser-cutting the negative electrode original plate 500 in a silicon-containing gas. Alternatively, silicon or a silicon-containing compound such as silicon oxide may be contained in the negative electrode active material layer 5b and the negative electrode original plate 500 may be laser-cut in the region where the negative electrode active material layer 5b is formed, to gasify the silicon or the silicon compound, and the gas flow may be controlled so that the gas is sprayed on the molten negative electrode core body 5a. In the case where silicon or a silicon-containing compound such as silicon oxide is contained in the negative electrode active material layer 5b, 1 to 10 mass % silicon or a silicon-containing compound such as silicon oxide may be contained in the negative electrode active material layer 5b.

In the negative electrode plate 5, the coating 5x containing silicon is not necessarily be formed on the end surface of the negative electrode core body 5a on the three sides other than the first side 5A.

[Fabrication of Electrode Assembly]

Figure 6:
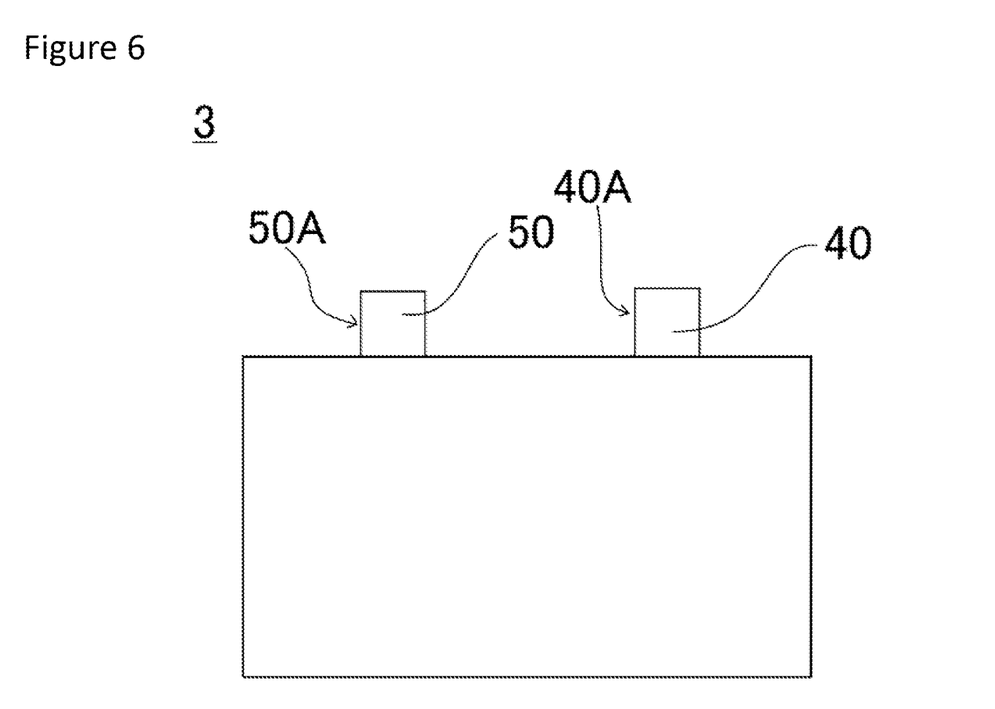
FIG. 6 is a plan view of an electrode assembly according to the embodiment.

The positive electrode plate 4 and the negative electrode plate 5 fabricated by the aforementioned method are laminated with a separator therebetween, thereby fabricating a laminated electrode assembly 3. FIG. 6 is a plan view of the electrode assembly 3. A positive electrode tab group 40A of positive electrode tabs 40 and a negative electrode tab group 50A of negative electrode tabs 50 are provided at one end of the electrode assembly 3.

[Connection Between Current Collector and Tabs]

Figure 7:
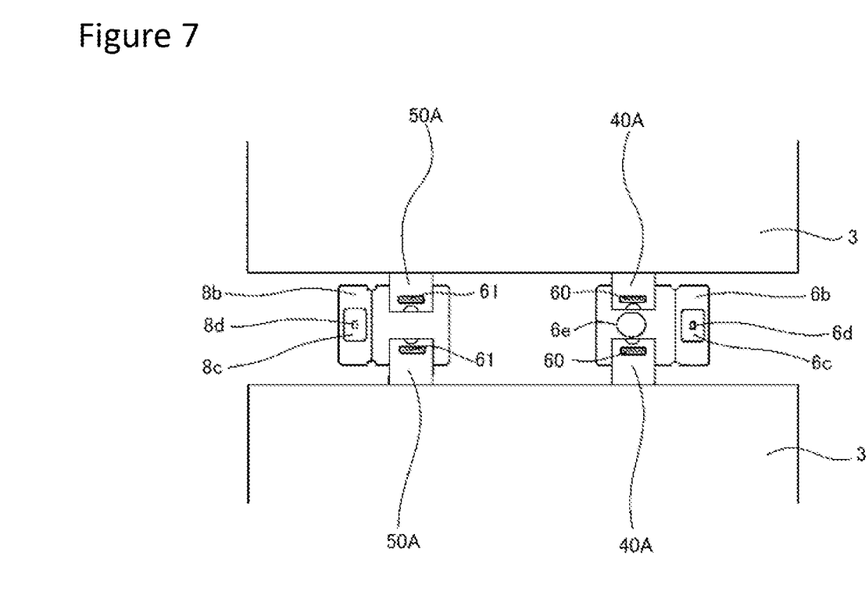
FIG. 7 is a diagram showing a state in which a positive electrode tab group is connected to a second positive electrode current collector and a negative electrode tab group is connected to a second negative electrode current collector.

As shown in FIG. 7, the positive electrode tab groups 40A of the two electrode assemblies 3 are connected to the second positive electrode current collector 6b, and the negative electrode tab groups 50A of the two electrode assemblies 3 are connected to the second negative electrode current collector 8b. The positive electrode tab groups 40A are welded and joined to the second positive electrode current collector 6b, thereby forming a welded connection portion 60. The negative electrode tab groups 50A are welded and joined to the second negative electrode current collector 8b, thereby forming a welded connection portion 61.

A thin portion 6c is formed in the second positive electrode current collector 6b, and a current collector opening 6d is formed in the thin portion 6c. In the thin portion 6c, the second positive electrode current collector 6b is connected to the first positive electrode current collector 6a. In the second positive electrode current collector 6b, a current collector through hole 6e is formed in a position facing the electrolytic solution injection hole 15 of the sealing plate 2.

A thin portion 8c is formed in the second negative electrode current collector 8b, and a current collector opening 8d is formed in the thin portion 8c. In the thin portion 8c, the second negative electrode current collector 8b is connected to the first negative electrode current collector 8a.

A connection between the positive electrode tab group 40A and the second positive electrode current collector 6b can be achieved by ultrasonic welding, resistance welding, laser welding, or the like.

[Mounting of Components to Sealing Plate]

Figure 8:
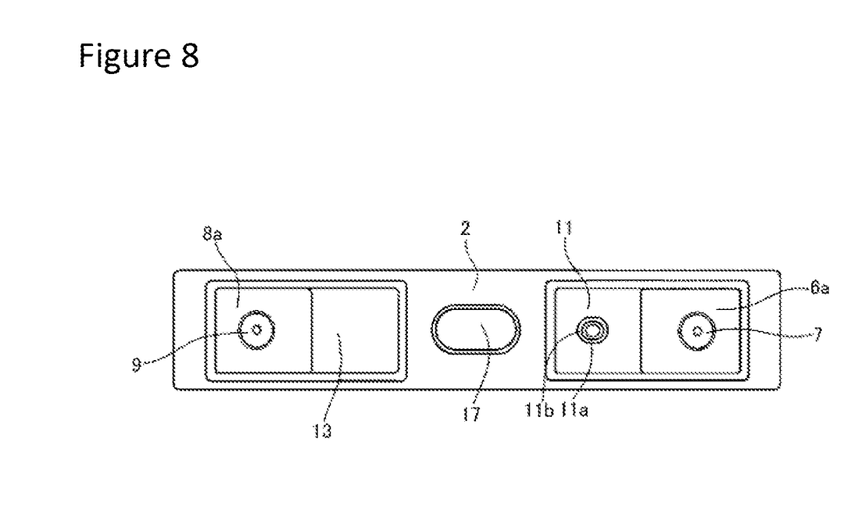
FIG. 8 is a diagram showing a surface of a sealing plate adjacent to the electrode assembly after the first positive electrode current collector and the first negative electrode current collector are attached to the sealing plate.

FIG. 8 is a diagram showing the inner side of the battery of the sealing plate 2 mounted with the components. Each component is mounted to the sealing plate 2 in the following manner.

An external insulating member 10 is located on the outer side of the battery around the positive electrode terminal insertion hole 2a of the sealing plate 2. An internal insulating member 11 and a first positive electrode current collector 6a are located on the inner side of the battery around the positive electrode terminal insertion hole 2a of the sealing plate 2. After that, the positive electrode terminal 7 is inserted from the outside of the battery into the through hole of the external insulating member 10, the positive electrode terminal insertion hole 2a of the sealing plate 2, the through hole of the internal insulating member 11, and the through hole of the first positive electrode current collector 6a, and the end of the positive electrode terminal 7 is crimped onto the first positive electrode current collector 6a. Hence, the positive electrode terminal 7 and the first positive electrode current collector 6a are fixed to the sealing plate 2. Note that the crimped portion of the positive electrode terminal 7 and the first positive electrode current collector 6a are preferably connected by welding.

An external insulating member 12 is located on the outer side of the battery around the negative electrode terminal insertion hole 2b of the sealing plate 2. An internal insulating member 13 and a first negative electrode current collector 8a are located on the inner side of the battery around the negative electrode terminal insertion hole 2b of the sealing plate 2. After that, the negative electrode terminal 9 is inserted from the outside of the battery into the through hole of the external insulating member 12, the negative electrode terminal insertion hole 2b of the sealing plate 2, the through hole of the internal insulating member 13, and the through hole of the first negative electrode current collector 8a, and the end of the negative electrode terminal 9 is crimped onto the first negative electrode current collector 8a. Hence, the negative electrode terminal 9 and the first negative electrode current collector 8a are fixed to the sealing plate 2. Note that the crimped portion of the negative electrode terminal 9 and the first negative electrode current collector 8a are preferably connected by welding.

In the internal insulating member 11, a solution injection opening 11a is provided in a portion facing the electrolytic solution injection hole 15 provided in the sealing plate 2. A tubular part 11b is provided at the edge of the solution injection opening 11a.

[Connection Between First Current Collector and Second Current Collector]

Figure 9:
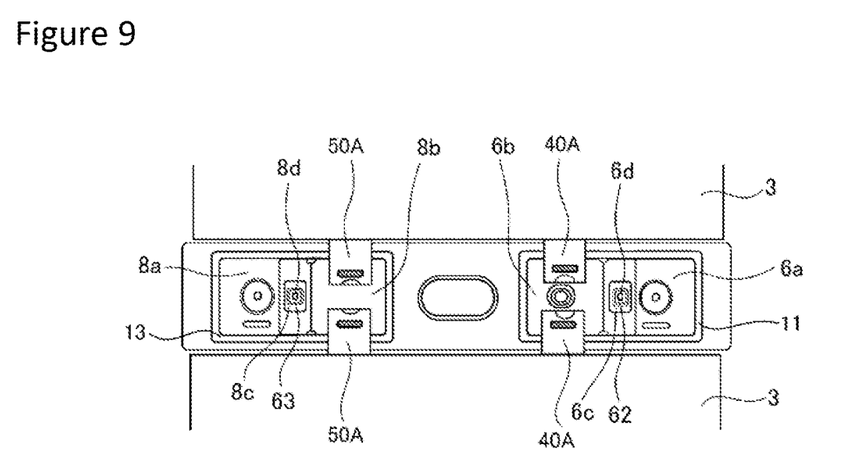
FIG. 9 is a diagram showing a surface of the sealing plate adjacent to the electrode assembly after the second positive electrode current collector is attached to the first positive electrode current collector and the second negative electrode current collector is attached to the first negative electrode current collector.

FIG. 9 shows the inside of the battery of the sealing plate 2 after the second positive electrode current collector 6b is mounted to the first positive electrode current collector 6a and the second negative electrode current collector 8b is mounted to the first negative electrode current collector 8a. The second positive electrode current collector 6b to which the positive electrode tab group 40A is connected is located on the internal insulating member 11 so that a part thereof overlaps with the first positive electrode current collector 6a. The thin portion 6c is irradiated with a laser beam, so that the second positive electrode current collector 6b and the first positive electrode current collector 6a are connected by welding, thereby forming a welded connection portion 62. The second negative electrode current collector 8b to which the negative electrode tab group 50A is connected is located on the internal insulating member 13 so that a part thereof overlaps with the first negative electrode current collector 8a. The thin portion 8c is irradiated with a laser beam, so that the second negative electrode current collector 8b and the first negative electrode current collector 8a are connected by welding, thereby forming a welded connection portion 63.

[Fabrication of Secondary Battery]

Two positive electrode tab groups 40A and two negative electrode tab groups 50A are curved so that the upper side of one electrode assembly 3 in FIG. 9 (the side further to the viewer in FIG. 9) and the upper side of the other electrode assembly 3 (the side closer to the viewer in FIG. 9) cone into contact with each other directly or via another member. As a result, the two electrode assemblies 3 are combined into one unit. The two electrode assemblies 3 are located in an electrode assembly holder 14 consisting of a box-shaped or a bag-shaped insulating sheet.

One positive electrode tab group 40A and the other positive electrode tab group 40A are curved in different directions. One negative electrode tab group 50A and the other negative electrode tab group 50A are curved in different directions.

The two electrode assemblies 3 wrapped in the electrode assembly holder 14 are inserted into the square exterior body 1. The sealing plate 2 and the square exterior body 1 are then welded to seal the opening of the square exterior body 1 with the sealing plate 2. The electrolytic solution is then injected into the square exterior body 1 through the electrolytic solution injection hole 15 provided in the sealing plate 2. After that, the electrolytic solution injection hole 15 is sealed with a sealing member 16 such as a blind rivet. Thus, the square secondary battery 20 is completed.

The thickness of the silicon-containing coating formed on the end surface of the core body may fall in the range of 0.05 to 5 μm. Note that the thickness of the silicon-containing coating is preferably in the range of 0.1 to 2 μm, more preferably 0.1 to 0.9 μm. Making the thickness of the silicon-containing coating relatively small can suppress the peeling off of the silicon-containing coating from the end surface of the core body.

Note that the silicon-containing coating formed on the end surface of the core body may have electrical conductivity. Here, the electric conductivity of the silicon-containing coating is preferably lower than the electric conductivity of the core body. Further, the electric conductivity of the silicon-containing coating is preferably lower than the electric conductivity of the active material layer.

The silicon-containing coating can be, for example, a mixed layer of silicon or a silicon-containing compound and a resin. The silicon-containing coating can be a copper-silicon alloy layer.

The thickness of the core body is preferably 5 to 30 μm, more preferably 5 to 20 μm.

Although the aforementioned embodiment showed the example in which two electrode assemblies are located in the battery case, one or three or more electrode assemblies may be used. The electrode assemblies may be laminated electrode assemblies or wound electrode assemblies.

The details of the configuration of the end portion of the active material layer-free portion have been described for the positive electrode plate in the aforementioned embodiment, and the same configuration can be applied to the negative electrode plate.

Although the example in which the positive electrode current collector and the negative electrode current collector are each composed of two parts has been described in the aforementioned embodiment, the positive electrode current collector and the negative electrode current collector may each be composed of one part.

Known materials can be used for the positive electrode plate, the negative electrode plate, the separator, the electrolyte, and the like.

REFERENCE SIGNS LIST 20 square secondary battery
1 square exterior body
2 sealing plate
2a positive electrode terminal insertion hole
2b negative electrode terminal insertion hole
100 battery case
3 electrode assembly
4 positive electrode plate
4a positive electrode core body
4b positive electrode active material layer
4c positive electrode protective layer
4d positive electrode core body exposed portion
40 positive electrode tab
40A positive electrode tab group
400 positive electrode original plate
401 positive electrode original plate with tabs already formed
5 negative electrode plate
5A first side
5a negative electrode core body
5b negative electrode active material layer
5c negative electrode core body exposed portion
50 negative electrode tab
50A negative electrode tab group
5x coating
6 positive electrode current collector
6a first positive electrode current collector
6b second positive electrode current collector
6c thin portion
6d current collector opening
6e current collector through hole
7 positive electrode terminal
8 negative electrode current collector
8a first negative electrode current collector
8b second negative electrode current collector
8c thin portion
8d current collector opening
9 negative electrode terminal
10 external insulating member
11 internal insulating member
11a solution injection opening
11b tubular part
12 external insulating member
13 internal insulating member
14 electrode assembly holder
15 electrolytic solution injection hole
16 sealing member
17 gas discharge valve
60, 61, 62, 63 welded connection portion

The invention claimed is:

1. A secondary battery electrode plate comprising a metal core body and an active material layer on both opposite major surfaces of the core body, said both opposite major surfaces being each enclosed by a perimeter of the core body, wherein
the electrode plate comprises:
a first perimetric edge defined by a first part of the perimeter of the core body extending in a first direction perpendicular to a thickness direction of the core body,
a first end surface connecting the opposite major surfaces of the core body and adjacent to the first perimetric edge, and
a tab being a part of the core body and protruding from the first perimetric edge in a second direction different than the first direction and perpendicular to the thickness direction of the core body,
the tab comprises:

a second perimetric edge defined by a second part of the perimeter of the core body extending in the second direction, and a second end surface connecting the opposite major surfaces of the core body and adjacent to the second perimetric edge, and a coating containing silicon is formed on the first end surface of the electrode plate and the second end surface of the tab, wherein said coating on the second end surface extends across an entire length of the second perimetric edge of the tab in the second direction.

2. The secondary battery electrode plate according to claim 1, wherein the core body is composed of copper or a copper alloy.

3. A secondary battery comprising:
the electrode plate according to claim 1; and
another electrode plate having a polarity different from that of the electrode plate.

4. The secondary battery electrode plate according to claim 1, wherein a thickness of the coating is 5 μm or less.

5. The secondary battery electrode plate according to claim 1, wherein the tab is monolithic with the core body.

6. The secondary battery electrode plate according to claim 1, wherein
the core body includes a protrusion that protrudes locally from one of the major surfaces of the core body in the thickness direction at the first perimetric edge of the core body, and
the coating covers the protrusion of the core body.

* * * * *